United States Patent [19]

Cuba

[11] 4,310,998
[45] Jan. 19, 1982

[54] GRASS COLLECTION CART

[75] Inventor: Ronald R. Cuba, Plymouth, Wis.

[73] Assignee: Gilson Brothers Company, Plymouth, Wis.

[21] Appl. No.: 151,840

[22] Filed: May 21, 1980

[51] Int. Cl.³ .................................. A01D 35/22
[52] U.S. Cl. ........................... 56/202; 56/13.4; 56/16.6; 56/320.2
[58] Field of Search ............... 56/202, 320.2, 13.4, 56/13.6, 16.6

[56] References Cited

U.S. PATENT DOCUMENTS

| | | | |
|---|---|---|---|
| 3,522,695 | 8/1970 | Musgrave | 56/202 |
| 3,905,181 | 9/1975 | Messner | 56/13.4 |
| 3,974,631 | 8/1976 | Rhodes | 56/202 |
| 4,104,852 | 8/1978 | Tackett | 56/202 |
| 4,173,111 | 11/1979 | Peterson | 56/202 |

FOREIGN PATENT DOCUMENTS 2716644 10/1978 Fed. Rep. of Germany ........ 56/202

Primary Examiner—Jay N. Eskovitz

[57] ABSTRACT

A grass collection cart having an access door and a closed bottom portion receives the airborne grass clippings discharged by a rotary cutting blade assembly. Auxiliary walls on the access door define an air discharge passage having an intake end spaced from the closed bottom portion of the cart and communicating with the interior of the cart when the access door is in its closed position. The discharge passage also has an outlet end opening near the ground. The incoming flow of airborne grass clippings entering the interior of the cart is directed toward the closed bottom portion and away from the intake end of the discharge passage so that the incoming flow of air will be deflected by the closed bottom portion toward the intake end of the discharge passage. The grass clippings consequently settle from the air stream and into the closed bottom portion, and the outgoing flow of air is expelled from the cart through the discharge passage near ground level. In its preferred embodiment, the rotary cutting blade assembly includes a fan system which enhances the flow of airborne grass clippings into the cart.

15 Claims, 7 Drawing Figures

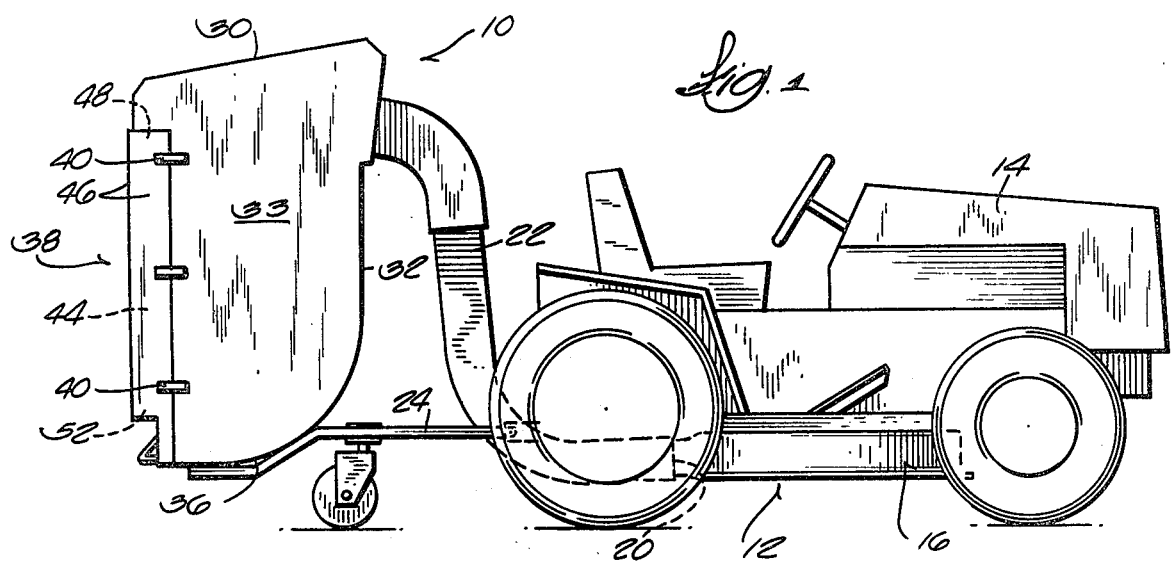
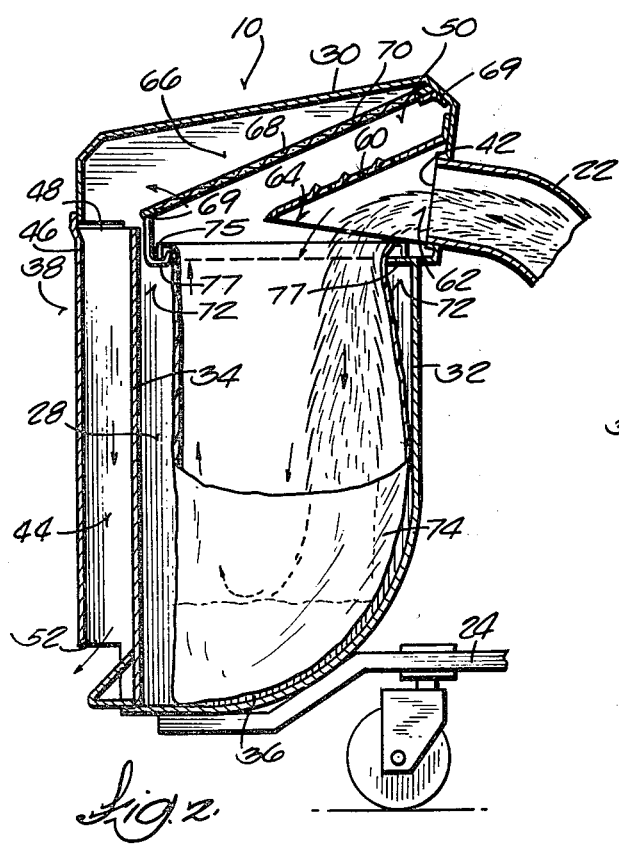
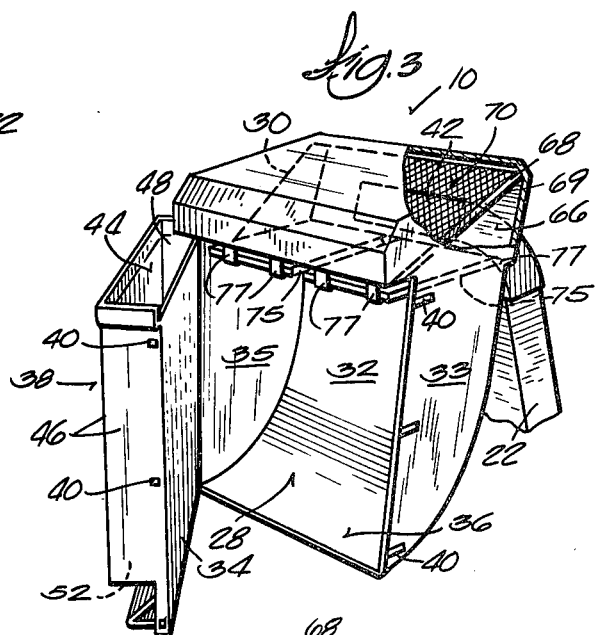
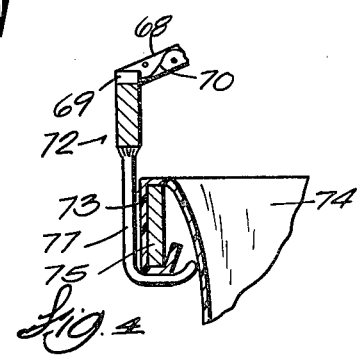

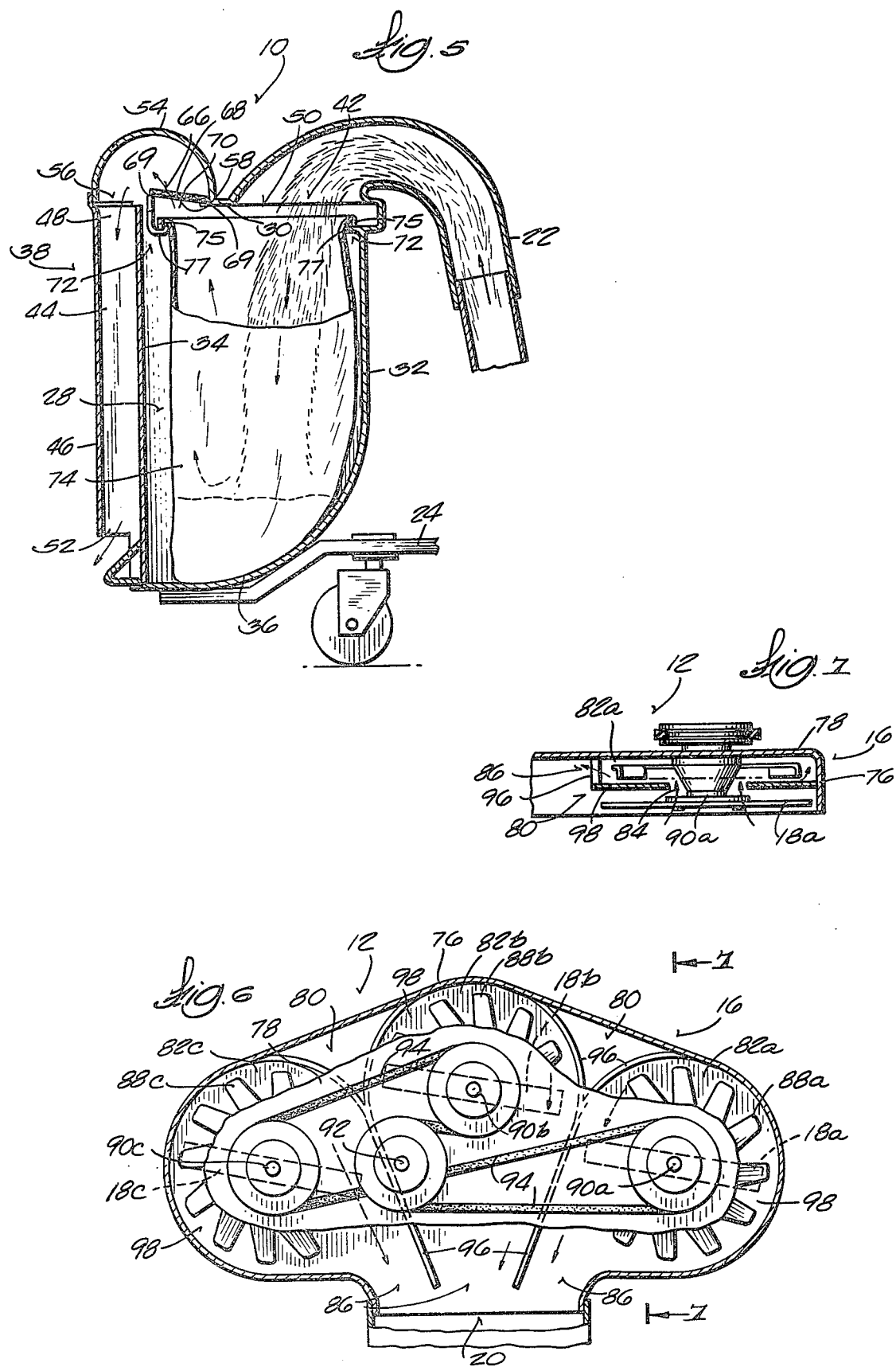

GRASS COLLECTION CART

FIELD OF THE INVENTION

The invention generally relates to rotary lawn mowers. More particularly, the invention relates to grass discharge and collection assemblies for rotary lawn mowers.

DESCRIPTION OF THE PRIOR ART

Attention is directed to the following United States Patents which generally concern grass collection assemblies used in connection with lawn care devices:

| Weiland | 3,367,091 | February 6, 1968 |
|---------|-----------|------------------|
| Leader | 3,423,917 | January 28, 1969 |
| Giraud | 3,777,461 | December 11, 1973 |
| Seifert et al | 3,890,772 | June 24, 1975 |

Attention is also directed to the following United States Patents which generally concern rotary type lawn mowers having associated fan assemblies to enhance air flow within the mower housings:

| Koch, et al | 2,547,328 | April 3, 1951 |
|-------------|-----------|---------------|
| Sutton | 2,777,271 | January 15, 1957 |
| Mitchell, et al | 2,779,146 | January 29, 1957 |
| Denney | 2,888,796 | June 2, 1959 |
| Boesch, et al | 2,953,887 | September 27, 1960 |
| Denney | 3,002,331 | October 3, 1961 |
| Hall | 3,091,906 | June 4, 1963 |
| Messner | 3,905,181 | September 16, 1975 |

Many conventional lawn mowers include associated grass collection assemblies. It is desirable that grass collection assemblies operate efficiently, so that substantially all of the grass clippings are collected by the assemblies and the working environment around the lawn mowers, and particularly at the operator's head level, is as free of stray airborne grass clippings as possible.

SUMMARY OF THE INVENTION

The invention generally provides a grass collection cart having an access door. The cart is constructed so that virtually all of the airborne grass clippings which enter the cart settle in the cart and air is discharged from the cart through a hollow passage formed on the access door. The invention also provides a rotary cutting blade assembly having an associated grass discharge system which enhances the flow of airborne grass clippings into the cart.

More particularly, the grass clipping collection cart includes a frame which is attachable to a rotary lawn mower. Spaced walls on the frame enclose an interior grass storage area having a closed bottom portion. One of the walls is hingedly attached to provide the access door which is movable between an open position permitting access into the interior storage area and a closed position blocking the access. Another one of the walls has an inlet opening spaced from the closed bottom portion. Auxiliary wall means on the access door defines an air discharge passage having an intake end spaced from the closed bottom portion and communicating with the interior storage area when the access door is in the closed position, as well as an outlet end communicating with the atmosphere. A grass discharge chute conducts airborne grass clippings from the grass discharge outlet of the lawn mower into the interior storage area through the inlet opening in response to lawn mower operation. Means is on the frame for directing the flow of grass clippings entering the cart through the inlet opening toward the closed bottom portion of the interior storage area and away from the intake end of the air discharge passage. By virtue of this construction, the incoming airflow is deflected by the closed bottom portion of the cart upwardly toward the intake end of the discharge passage, and substantially all of the grass clippings settle in the closed bottom portion of the cart. Air which is virtually free of airborne grass clippings is subsequently discharged from the interior storage area through the air discharge passage when the access door is in the closed position.

In its preferred embodiment, the outlet end of the air discharge passage is located close to the ground so that air is expelled from the cart away from the operator's head level, thereby contributing to a cleaner working environment around the cart.

Also in its preferred embodiment, the rotary lawn mower to which the collection cart is attached comprises a housing enclosing the rotary cutting blade and including a continuous sidewall and a top deck which extends from the sidewall. Wall means are provided for defining a chamber intermediate the top deck and the rotary cutting blade. The chamber communicates through an inlet opening with the portion of the housing in which the cutting blade rotates and through an outlet opening with the grass discharge chute. Fan means is rotatably mounted in the chamber for drawing air upwardly through the inlet opening into the chamber and for discharging this air outwardly from the chamber through the outlet opening into the grass discharge chute. The additional airflow generated by the fan means facilitates delivery of airborne grass clippings from the mower to the cart.

DESCRIPTION OF THE DRAWINGS

FIG. 1 is a side view of a grass collection cart which is hitched to a tractor and which receives the grass clippings discharged by a rotary cutting blade assembly carried by the tractor;

FIG. 2 is a sectional side view of one embodiment of the grass collection cart shown in FIG. 1;

FIG. 3 is a perspective view of the grass collection cart shown in FIG. 2 with the access door in its open position;

FIG. 4 is an enlarged, fragmentary view of the assembly by which a grass collection bag may be mounted in the cart shown in FIGS. 2 and 3;

FIG. 5 is a sectional side view of an alternate embodiment of the grass collection cart shown in FIG. 1;

FIG. 6 is a top view, partly broken away, showing an embodiment of the rotary cutting blade assembly associated with the grass collection cart; and FIG. 7 is a side sectional view of the rotary cutting blade assembly taken generally along line 7—7 of FIG. 6.

DESCRIPTION OF THE PREFERRED EMBODIMENT

A grass collection cart 10 which accumulates the grass clippings discharged by an associated rotary cutting blade assembly 12 is shown in the drawings. As shown in FIG. 1, the rotary cutting blade assembly 12 is attached to the underbody of a tractor 14 for movement over the ground and is operatively connected with the drive unit (not shown) of the tractor 14 to perform grass cutting operations. In this embodiment, the grass collection cart 10 is towed behind the tractor 14. It is to be appreciated, however, that the grass collection cart 10 as will hereafter be described is broadly applicable for use in connection with all types of rotary lawn mowers.

In the illustrated embodiment, and referring first principally to FIGS. 6 and 7, the rotary cutting blade assembly 12 includes a housing 16 which is carried on the underbody of the tractor 14 and which encloses three rotary cutting blades 18a, 18b, and 18c (as shown in phantom lines in FIG. 6). The cutting blades 18a, 18b and 18c are operatively connected with the drive unit of the tractor 14. The housing 16 has a grass discharge outlet 20 through which airborne grass clippings are expelled from the housing 16 in response to rotation of the cutting blades 18a, 18b, 18c. As is shown in FIG. 1, a grass discharge chute 22 is attached to the discharge outlet 20 to conduct these airborne grass clippings from the housing 16 to the grass collection cart 10.

Referring first to the particular construction of the grass collection cart 10, and in particular to FIGS. 1 and 3, a wheeled frame 24 is hitched to the rear end of the tractor 14. However, it should be appreciated that the frame 24 could be attached directly to the chassis of the tractor 14 for movement with the tractor 14 without the use of wheels. Spaced walls are attached to the frame 24 and enclose an interior grass storage area 28. More particularly, the spaced walls include a top wall 30 and adjoining sidewalls 32, 33, 34, and 35 which are all rigidly attached to the frame 24. In the illustrated embodiment, one of the sidewalls 32 includes a lower tapered portion which defines a closed bottom portion 36 of the storage area 28.

The cart 10 includes a door 38 to permit access into the storage area 28. In the illustrated embodiment, the sidewall 34 oppositely spaced from the sidewall 32 having the lower tapered portion 36 is hingedly attached to the sidewall 35 to form the access door 38. The door 38 is movable between an open position (as shown in FIG. 3) which permits access into the storage area 28 and a closed position (as shown in FIGS. 1, 2, and 5) which blocks the access. Suitable latching assemblies 40 are provided so that the door 38 may be locked in its closed position.

The grass discharge chute 22 communicates with an inlet opening 42 which is formed in one of the walls of the cart 10 so that airborne grass clippings may be carried into the cart 10. An air discharge passage 44 is also provided on one of the walls so that air may be expelled from the cart 10. In the illustrated embodiment, the air discharge passage 44 is formed by auxiliary walls 46 extending outwardly of the sidewall 34 which forms the access door 38. The discharge passage 44 has an intake end 48 which communicates with the storage area 28 when the access door 38 is closed. The intake end 48 is located on the upper portion of the access door 38 and thereby spaced closer to the top wall 30 of the cart 10 than to the bottom portion 36 of the storage area 28.

The discharge passage 44 has an outlet end 52 spaced from the intake end 48 and communicating with the atmosphere close to the ground. By virtue of this construction, the flow of air through the air discharge passage 44 is directed toward the ground and away from the operator.

Means 50 is provided to direct the incoming flow of airborne grass clippings entering through the inlet opening 42 away from the intake end 48 of the discharge passage 44 and toward the closed bottom portion 36 of the storage area. As will soon become apparent, by virtue of the directed flow of grass clippings entering the storage area 28, substantially all of the airborne grass clippings are collected in the bottom portion 36 of the storage area 28, and the air subsequently discharged at ground level through the discharge passage 44 is relatively free of airborne grass clippings. Efficiency of operation and a cleaner working environment around the cart 10 are thereby achieved.

While the placement of the inlet opening 42 and the associated air flow control means 50 relative to the intake end 48 of the discharge passage 44 may vary, two alternate embodiments are shown and described. In one embodiment, shown in FIG. 5, the inlet opening 42 is formed in the top wall 30. In this embodiment, the intake end 48 of the air discharge passage 44 communicates with the interior storage area 28 through a generally dome shaped hump or chute 54 which is formed in the top wall 30 of the cart 10. One end 56 of the chute 54 communicates with the intake end 48 of the discharge passage 44 when the access door 38 is in its closed position, and the other end 58 communicates with the grass storage area 28 through the top wall 30 closely adjacent to the inlet opening 42.

By virtue of this arrangement, and as generally shown by arrow in FIG. 5, the flow of incoming airborne grass clippings entering through the inlet opening 42 first proceeds downwardly away from the top wall 30 and the chute 54 formed therein and toward the closed bottom portion 36 of the storage area 28. The air stream is next deflected by the closed bottom portion 36 and reverses direction, and, in doing so, the airborne grass clippings settle from the air stream into the closed bottom portion 36. The outgoing flow of air, which is now substantially free of grass clippings, proceeds upwardly from the closed bottom portion 36 toward the top wall 30 and enters the chute 54 for ground level discharge through the passage 44.

Referring now to the other embodiment, shown in FIGS. 2 and 3, the inlet opening 42 is formed in a sidewall of the cart, and more particularly, in the sidewall 32 which is oppositely spaced from the access door 38. In this embodiment, the intake end 48 of the discharge passage 44 is generally horizontally aligned with the inlet opening 42 and faces the top wall 30 which in this embodiment is generally planar and extends above both the inlet opening 42 and intake end 48. An air deflection hood 60 is attached to the sidewall 32 and has one end 62 which communicates with the inlet opening 42 and another end 64 which faces the closed bottom portion 36 of the cart 10.

By virtue of this construction, and as generally shown by arrows in FIG. 2, the flow of incoming airborne grass clippings is directed by the air deflection hood 60 downwardly toward the closed bottom portion 36 of the storage area 28 and away from the intake end 48 of the discharge passage 44. As before described, the grass clippings settle in the closed bottom portion 36 of the storage area 28 as the air flow is there deflected and caused to reverse direction, and the outgoing flow of air proceeds upwardly away from the closed bottom portion 36 toward the top wall 30 and enters the intake end 48 of the discharge passage 44 for discharge at ground level.

A filter assembly 66 may be provided in both the first and second embodiments to further assure that the air expelled from the storage area 28 is as free of grass clippings as possible. As is shown in FIGS. 2 and 5, the filter assembly 66 includes a filter frame 68 which is mounted on brackets 69 in the storage area 28 in the path of the outgoing air flow. More particularly, in the embodiment of FIG. 5, the filter frame 68 extends coextensively over the chute end 58 which opens into the storage area 28. In the embodiment of FIG. 2, the filter frame 68 extends from brackets 69 located in the top corner of the storage area 28 above the air deflection hood 60 to other brackets 69 (see FIG. 3) located closely adjacent to the sidewall 34 which forms the interior surface of the access door 38. Wire mesh or other suitable filter material 70 is carried in the filter frame 68 to catch stray airborne grass clippings carried by the outgoing flow of air and to thereby prevent those stray clippings from entering the intake end 48 of the discharge passage 44.

Also in both the first and second embodiments, mounting assemblies 72 may be provided upon which one or more grass collection bags 74 may be mounted in the storage area 28 to collect the incoming flow of airborne grass clippings. In the illustrated embodiments (see FIGS. 2, 3, 4 and 5), the peripheral edges 73 of the open end of the bag 74 are wrapped around a bag mounting frame 75 (see in particular FIG. 4). The bag mounting frame 75 is thereafter positioned in the storage area on brackets 77. It should be appreciated that the flow of air within each grass collection bag 74 follows the path as heretofore described so that the grass clippings settle in the bottom of the bag 74.

In the illustrated embodiment, the rotary cutting blade assembly 12 includes a grass discharge circulation system to improve the airflow within the housing 16 of the cutting blade assembly 12 and thus enhance the flow of airborne grass clippings from the grass discharge outlet 20 into the cart 10. More particularly, and referring now to FIGS. 6 and 7, the housing 16 which encloses the rotary cutting blades 18a, 18b, and 18c includes a continuous sidewall 76 and a top deck 78 which extends from the sidewall 76. Wall means 80 defines a series of intermediate chambers 82a, 82b, and 82c located between the top deck 78 and of each cutting blade 18a, 18b, and 18c. Each intermediate chamber 82a, 82b and 82c has an inlet opening 84 which communicates with the lower portion of the housing 16 in which the associated cutting blade 18a, 18b and 18c rotates and an outlet opening 86 which communicates with the grass discharge chute 22 in common with the outlet openings 86 of the other intermediate chambers as well as in common with the grass discharge outlet 20.

Fan means 88a, 88b, and 88c is rotatably mounted in each chamber 82a, 82b, and 82c and is operative for drawing air from within the housing 16 upwardly into the chamber 82a, 82b, and 82c through the inlet opening 84 (as shown by arrows in FIG. 7) and for subsequently discharging the air from the chamber 82a, 82b, and 82c through the outlet opening 86 (as shown by arrows in FIG. 6) and into the grass discharge chute 22. The fan means 88a, 88b, and 88c thus serve to increase the velocity of air passing through the grass discharge chute 22 to enhance the flow of airborne grass clippings from the grass discharge outlet 20 to the cart 10.

In the illustrated embodiment, each rotary cutting blade 18a, 18b, and 18c is bolted to the end of a drive shaft, respectively 90a, 90b, and 90c, which extends through the top deck 78 and into the housing 16. Drive shaft 90b is operatively connected with the drive unit of the tractor 14 by suitable means, such as a belt and pulley arrangement (not shown), and a belt transmission 94 including idler 92 operatively connects drive shafts 90a and 90c with drive shaft 90b so that the cutting blades 18a, 18b, and 18c rotate simultaneously during tractor operation.

Intermediate sidewalls 96 extend from the housing sidewalls 76 and downwardly from the top deck 78, and annular plates 98 are attached to the intermediate sidewalls 96 above each cutting blade 18a, 18b, and 18c. Together the sidewalls 96 and plates 98 partition the interior area of the housing 16 into the three generally cylindrical chambers 82a, 82b, and 82c which commonly open into the discharge chute 22. Each annular plate 98 includes a central opening which corresponds to the inlet opening 84 and which also accommodates the associated drive shaft 90a, 90b, and 90c.

A fan 88a, 88b, and 88c is mounted on the drive shaft 90a, 90b, 90c which passes through each chamber 82a, 82b, and 82c and thus rotates in common with the associated cutting blade 18a, 18b, and 18c. Fan rotation draws air upwardly through the inlet opening 84 into each chamber 82a, 82b, and 82c and discharges the air from the chamber 82a, 82b and 82c through the associated outlet opening 86 into the grass discharge chute 22.

While, in the illustrated embodiment, three rotary cutting blades 18a, 18b and 18c and three associated intermediate chambers 82a, 82b, and 82c and fans 88a, 88b and 88c are shown, it is to be appreciated that the grass discharge system is applicable for use in connection with lawn mowers having one or any number of cutting blades. Furthermore, while the grass discharge system as heretofore described facilitates the introduction of airborne grass clippings into the storage area 28 of the cart 10, such a discharge system is not essential in establishing the described flow of air through the cart 10. It should thus be appreciated that the grass collection cart 10 is applicable for use in combination with rotary lawn mowers which do not have the discharge system as heretofore described.

I claim:

1. A grass collection cart for accumulating the airborne grass clippings discharged by the grass discharge outlet of a rotary lawn mower, said cart comprising, a frame attachable to said rotary lawn mower, spaced walls on said frame defining an enclosed interior grass storage area having a closed bottom portion and one of said walls having an inlet opening spaced above said closed bottom portion, a grass discharge chute attachable to the grass discharge outlet of the rotary lawn mower and to said inlet opening for conducting the airborne grass clippings from the grass discharge outlet into said interior grass storage area in response to lawn mower operation, passage means connected to said frame for discharging air from said interior grass storage area, said passage means defining an air discharge passage having an intake end spaced from said closed bottom portion and communicating with said interior storage area and said air discharge passage channeling the air being discharged from said intake end toward said closed bottom portion for discharge of said air to the atmosphere adjacent the bottom of said cart and close to the ground, and means on said frame and communicating with said inlet opening for directing the incoming flow of airborne grass clippings entering said interior grass storage area through said inlet opening toward said closed bottom portion of said interior storage area and away from said intake end of said air discharge passage, whereby the incoming flow of air is directed toward said closed bottom portion and is deflected by said closed bottom portion and redirected toward said air discharge passage intake end and grass clippings settle into said closed bottom portion as the outgoing flow of air proceeds away from said closed bottom portion and toward said intake end of said air discharge passage.

2. A grass collection cart according to claim 1 wherein one of said walls of said frame is hingedly attached providing an access door movable between an open position permitting access into said interior storage area and a closed position blocking the access, wherein said hingedly attached wall comprises an inner wall defining a portion of said interior grass storage area and an auxiliary wall spaced from said inner wall and defining said passage means therebetween, and said inner wall and auxiliary wall at their upper ends defining said intake end of said air discharge passage and at their lower ends defining an outlet end for said air discharge passage through which air is discharged to the atmosphere close to the ground.

3. A grass collection cart according to claim 2 wherein said spaced walls include a wall spaced opposite to said wall providing said access door and said oppositely spaced wall includes a tapered portion extending toward said access door and defining said closed bottom portion of said interior grass storage area.

4. A grass collection cart according to claim 2 wherein said spaced walls include a top wall oppositely spaced above said closed bottom portion, wherein said intake end of said air discharge passage communicates with said interior grass collection area near said top wall when said access door is in said closed position, and wherein said outlet end of said air discharge passage communicates with the atmosphere close to the ground.

5. A grass collection cart according to claim 4 wherein said intake end of said air discharge passage faces said top wall when said access door is in said closed position.

6. A grass collection cart according to claim 5 wherein said inlet opening is formed in said top wall, and wherein said means for directing the incoming flow of airborne grass clippings includes a generally dome shaped chute formed on said top wall and having a first end communicating with said interior storage area adjacent to said inlet opening and a second end communicating with said intake end of said air discharge passage when said access door is in said closed position.

7. A grass collection cart according to claim 4 wherein said inlet opening is formed in one of said spaced walls other than said wall providing said access door.

8. A grass collection cart according to claim 7 wherein said wall having said inlet opening is oppositely spaced from said wall providing said access door.

9. A grass collection cart according to claim 7 or 8 wherein said inlet opening is located near said top wall.

10. A grass collection cart according to claim 9 wherein said means for directing the incoming flow of airborne grass clippings includes an air deflection hood attached to said sidewall having said inlet opening and having one end communicating with said inlet opening and a second end facing said closed bottom portion of said interior grass storage area and away from said intake end of said air discharge passage when said access door is in said closed position.

11. A grass collection cart according to claim 1 and further including filter means in said interior storage area communicating with said intake end of said air discharge passage for filtering airborne grass clippings from the air flowing toward said intake end.

12. A grass collection cart according to claim 1 and further includes means for mounting a grass collection bag in said interior grass storage area in communication with said inlet opening, and wherein said means for directing the incoming flow of airborne grass clippings is operative for directing grass clippings into said grass collection bag and away from said intake end of said air discharge passage.

13. A grass collection cart according to claim 1 wherein said frame includes at least one wheel for movement of said frame over the ground.

14. A lawn mower comprising a housing enclosing at least one rotary cutting blade and including a continuous sidewall having a grass discharge outlet, a top deck extending from said sidewall, wall means for defining a chamber intermediate said top deck and said rotary cutting blade and having an inlet opening communicating with the portion of said housing enclosing the associated cutting blade and an outlet opening communicating with the atmosphere, fan means rotatably mounted in said chamber for drawing air from said housing upwardly into said chamber through said inlet opening and for discharging the air outwardly from said chamber through said outlet opening, and a grass clipping collection cart including a frame attached to said rotary lawn mower, spaced walls on said frame enclosing an interior grass storage area having a closed bottom portion, one of said walls being hingedly attached providing an access door movable between an open position permitting access into said interior storage area and a closed position blocking the access, another one of said walls having an inlet opening spaced above said closed bottom portion, a grass discharge chute attachable to said grass discharge outlet and said outlet opening of said housing and to said inlet opening of said cart for conducting grass clippings from said grass discharge outlet of said housing into said interior storage area in response to rotation of said rotary cutting blade and said fan means, auxiliary wall means on said access door for defining an air discharge passage having an intake end spaced above said closed bottom portion and communicating with said interior grass storage area when said access door is in said closed position and an outlet end communicating with the atmosphere, and means on said frame and communicating with said inlet opening for directing the incoming flow of airborne grass clippings entering through said inlet opening toward said closed bottom portion of said interior storage area and away from said intake end of said air discharge passage, whereby the incoming flow of air is directed toward said closed bottom portion and is deflected by said closed bottom portion and redirected toward said air discharge passage intake end and grass clippings settle into said closed bottom portion as the outgoing flow of air proceeds away from said closed bottom portion toward said intake end of said air discharge passage.

15. A grass collection cart for accumulating the airborne grass clippings discharged by the grass discharge outlet of a rotary lawn mower, said cart comprising, a frame attachable to said rotary lawn mower, spaced walls on said frame defining an enclosed interior grass storage area having a closed bottom portion and one of said walls having an inlet opening spaced above said closed bottom portion, a grass discharge chute attachable to the grass discharge outlet of the rotary lawn mower and to said inlet opening for conducting the airborne grass clippings from the grass discharge outlet into said interior grass storage area in response to lawn mower operation, auxiliary wall means on another of said walls for defining therewith an air discharge passage having an intake end spaced from said closed bottom portion and communicating with said interior storage area and adapted to channel air being discharged from said intake end toward said closed bottom portion for discharge of said air to the atmosphere adjacent the bottom of said cart and close to the ground, and means on said frame and disposed at said inlet opening for directing the incoming flow of airborne grass clippings entering said interior grass storage area through said inlet opening toward said closed bottom portion of said interior storage area and away from said intake end of said air discharge passage, whereby the incoming flow of air is directed toward said closed bottom portion and is deflected by said closed bottom portion and redirected toward said air discharge passage intake end and grass clippings settle into said closed bottom portion as the outgoing flow of air proceeds away from said closed bottom portion and toward said intake end of said air discharge passage.

* * * * *